(12) United States Patent
Perreault

(10) Patent No.: US 7,896,249 B2
(45) Date of Patent: Mar. 1, 2011

(54) BAR CODE READER OR IMAGER USING CONTROLLED DEFORMATION OF FLEXIBLE OPTICS

(75) Inventor: Daniel C. Perreault, Everett, WA (US)

(73) Assignee: Intermec IP Corp., Everett, WA (US)

( * ) Notice: Subject to any disclaimer, the term of this patent is extended or adjusted under 35 U.S.C. 154(b) by 480 days.

(21) Appl. No.: 12/019,480

(22) Filed: Jan. 24, 2008

(65) Prior Publication Data

US 2009/0188978 A1    Jul. 30, 2009

(51) Int. Cl.
*G06K 7/10* (2006.01)
*G06K 7/14* (2006.01)

(52) U.S. Cl. ................................ 235/454; 235/375
(58) Field of Classification Search ............. 235/454, 235/375, 494; 29/237, 282, 283
See application file for complete search history.

(56) References Cited

U.S. PATENT DOCUMENTS

| | | | |
|---|---|---|---|
| 6,927,528 B2 | 8/2005 | Barillot et al. | |
| 7,021,114 B2 | 4/2006 | Perreault | |
| 7,372,614 B2 | 5/2008 | Govil et al. | |
| 7,379,247 B2 | 5/2008 | Goto | |
| 7,457,060 B2 | 11/2008 | Paik et al. | |
| 7,652,828 B2 | 1/2010 | Perreault | |
| 2007/0058070 A1 | 3/2007 | Chen | |
| 2008/0117489 A1 | 5/2008 | Tanaka et al. | |
| 2008/0264120 A1 | 10/2008 | Melz | |
| 2008/0264142 A1 | 10/2008 | Hanselka | |
| 2008/0302024 A1 | 12/2008 | Browne et al. | |
| 2009/0244687 A1 | 10/2009 | Perreault | |

OTHER PUBLICATIONS

Otsuka et al. "Introduction," Shape Memory Materials, Cambridge University Press, 1999, pp. 1-26.
Otsuka et al. "Mechanism of shape memory effect and superelasticity," Shape Memory Materials, Cambridge University Press, 1999, pp. 27-48.
Saburi, T., "Ti-Ni shape memorys alloys," Shape Memory Materials, Cambridge University Press, 1999, pp. 49-96.
Uchino, K. "Shape memory ceramics," Shape Memory Materials, Cambridge University Press, 1999, pp. 184-202.
Dynalloy, Inc., Makers of Dynamic Alloys, www.dynalloy.com.

*Primary Examiner*—Edwyn Labaze
(74) *Attorney, Agent, or Firm*—Perkins Coie LLP

(57) ABSTRACT

A flexible optic or optical system is deformed using a non-overlapping iris or any of several deformable ring or polygon shapes. In some examples, the deformation of the flexible optic is controlled by one or more actuators comprising a shape memory material. The flexible optic may be used in, e.g. a bar code reader or imager.

22 Claims, 9 Drawing Sheets

BAR CODE READER OR IMAGER USING CONTROLLED DEFORMATION OF FLEXIBLE OPTICS

BACKGROUND

Flexible optics can be deformed to modify their optical characteristics. For instance, a flexible lens or mirror can be curved or flattened to decrease or increase its focal length. Similarly, various types of flexible optics can be deformed to modify their reflection, refraction, deflection, and transmission characteristics.

In recent years, researchers have used flexible optics to provide advanced optical capabilities in environments where such capabilities were previously unavailable. For example, researchers have used flexible optics to provide advanced zoom capability in miniaturized camera systems found in certain cellular phones, surveillance systems, and robotics applications. This zoom capability is typically achieved by deforming a flexible lens to modify its focal length. Because this lens deformation does not require any translational movement by the entire lens, the zoom capability can be achieved in size-limited applications where translational movement such as that used traditional zoom lens assemblies is not possible.

Flexible optics such as those in the above applications can take a variety of different forms. For instance, they may be formed by any of several commercially available thin clear flexible polymer materials that are molded or cut into a variety of shapes convenient for optics. In some examples, these materials are coated with optical materials to improve their optical performance for specific uses.

While many flexible optics take the form of single film materials, it is also possible to create optics that use a combination of materials. For instance, some flexible optics have been formed by filling an enclosed membrane with a transparent fluid such as water, oil, or air. A liquid lens is an example. The optical properties of these types of optics can be adjusted, for example, by adjusting the diameter of a lens, or changing the amount of fluid in the membrane to modify the membrane's internal pressure.

Although researchers have successfully employed flexible optics in a variety of different environments, the performance and reliability of these flexible optics is typically limited by the performance and reliability of mechanical components used to control their deformation. For instance, the speed and precision with which a flexible lens can be deformed is generally determined by the response-time and accuracy of mechanical components used to control the lens's deformation. Similarly, the failure rate of an optical system including a flexible lens may be limited by the lifetime of the controlling mechanical components.

To illustrate some of the limitations imposed by traditional mechanical components, consider an optical system in which a flexible lens is deformed under the control of a small motor. The motor will typically experience some form of gear lash or hysteresis that will limit the speed and accuracy of its movement. Additionally, the motor may fail before the end of the lens's effective lifetime. Further, the motor is likely much thicker than the flexible lens, and therefore the motor will likely limit the degree to which the optical system can be miniaturized. Moreover, the cost of the motor is likely very high compared with the cost of the flexible lens. Finally, the motor may require a relatively complex control system to control its movement.

Most conventional optical systems using flexible optics suffer from some or all of the above mechanical problems. Accordingly, a need exists for techniques and technologies that overcome the above problems, as well as ones that provide additional benefits. Overall, the examples herein of some prior or related technologies and their associated limitations are intended to be illustrative and not exclusive. Other limitations of existing or prior technologies will become apparent to those of skill in the art upon reading the following Detailed Description.

DETAILED DESCRIPTION

Various examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

In general, examples of the invention provide various techniques and technologies for deforming a flexible optic in a bar code scanner or imager. In some examples, the flexible optic is deformed to change its focal length. For instance, a flexible lens or mirror is deformed to focus incoming light for a light detector. In other examples, a flexible lens or mirror is deformed to focus outgoing light for a light source such as a laser. Alternatively or additionally, the flexible optics may be deformed under the control of shape memory materials.

Many of the disclosed examples find ready application in a variety of optical instruments such as bar-code scanners, two-dimensional imagers, cameras, binoculars, telescopes, microscopes, and projectors, to name but a few. For instance, selected examples could be used to focus incoming light for an imager or camera, or outgoing light for a laser in a bar-code scanner.

The disclosed examples may employ any type of flexible optic, including but not limited to those made of clear flexible polymer materials, fluid filled membranes, fluid bubbles, and so on. Moreover, many of these optics can be coated or otherwise processed to vary their optical properties. For instance, optics could be coated and/or polished to form a mirror, or they could be coated or processed to form an optical filter. Further, the flexible optics may take on any of several different shapes. For instance, flexible lenses or mirrors may be plano/concave, plano/plano, etc., and they may be changed between different shapes through deformations.

In some examples, optical components are described as having a single focal length for any given configuration. However, in other examples, an optical component could simultaneously have multiple focal lengths or other optical characteristics. For example, bi-focal lenses have more than one focal length in a single configuration. In such components, one or more of the focal lengths or other optical characteristics could be modified using disclosed actuators.

Figure 1:
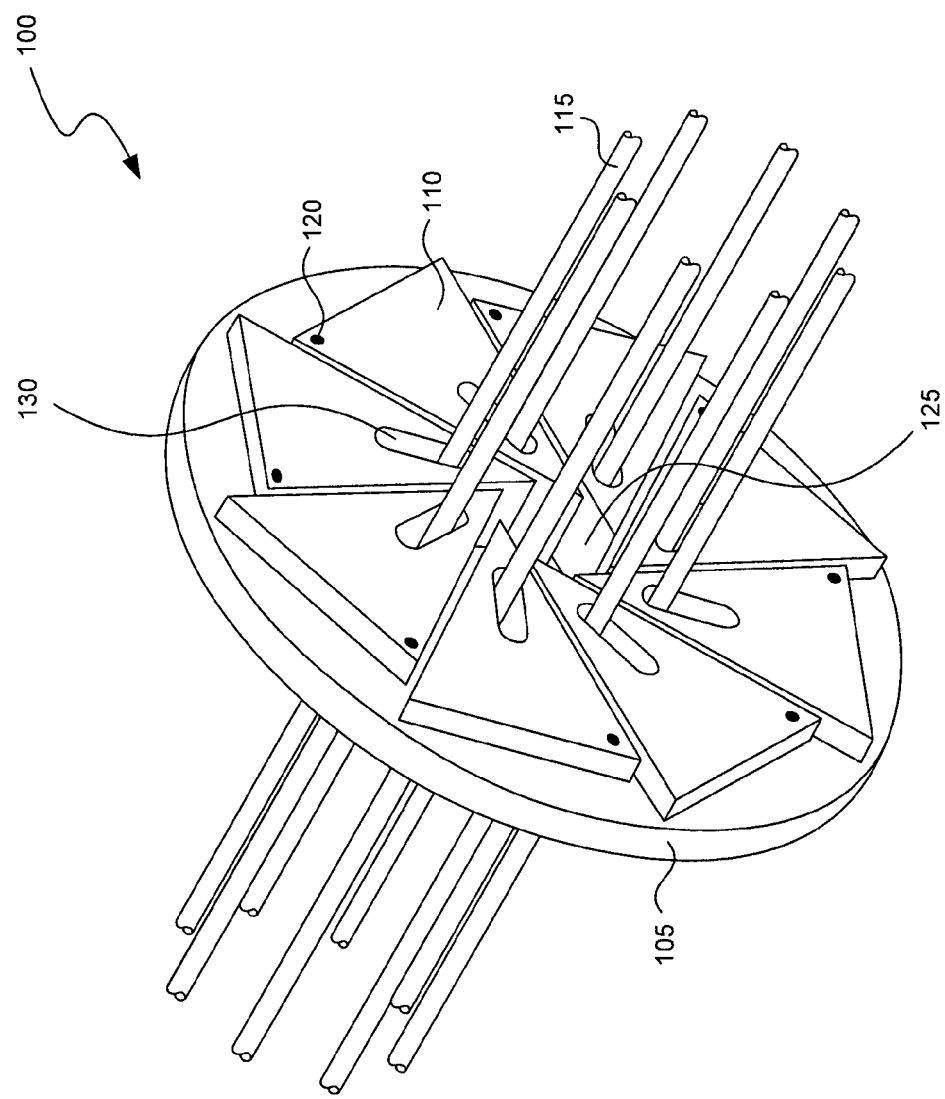
FIG. 1 is an isometric view illustrating an example non-overlapping iris used to control the deformation of a flexible optic.

FIG. 1 is a perspective view illustrating an example non-overlapping iris 100 used to control the deformation of a flexible optic. Non-overlapping iris 100 is similar to a device disclosed in U.S. Pat. No. 7,021,114, which is used for a wholly different purpose, namely to crimp stents for medical applications. While FIG. 1 shows one example of an iris, many other mechanical devices or configurations are possible to form an iris or other structure to deform one or more optical elements.

Referring to FIG. 1, iris 100 comprises a rotatable mount 105, non-overlapping wedge-shaped blades 110 attached to rotatable mount 105, and fixed constraining elements 115 (e.g., transverse rods or guide wires) each passing through a corresponding opening 130 in one of blades 110. A void at the center of blades 110 defines an aperture 125 through which light may pass through iris 100. As will be explained below, the size of aperture 125 is controlled by the rotation of rotatable mount 105.

Each of blades 110 is attached to rotatable mount 105 at a corresponding pivot point 120. Accordingly, when mount 105 rotates, each of blades 110 pivots about the corresponding pivot point 120 and the corresponding constraining element 115. The rotation of mount 105 and the resulting pivoting of blades 110 causes the size of aperture 125 to either expand or contract as shown in FIGS. 2A and 2B.

The rotation of mount 105 causes the diameter of aperture 125 to change by an amount that is linearly proportional to the amount of rotation, although other configurations may have a non-linear response curve. Accordingly, an encoder/decoder can be used to translate between the rotation of mount 105 and the size of aperture 125. This translated information can be used to accurately control the size of aperture 125.

In general, the rotation of mount 105 can be controlled by any of several known technologies such as a small motor or gear system attached to its outer edge as described and illustrated in U.S. Pat. No. 7,021,114. Additionally, as described in further detail below, the rotation of mount 105 can also be controlled using shape memory materials.

Figure 2A:
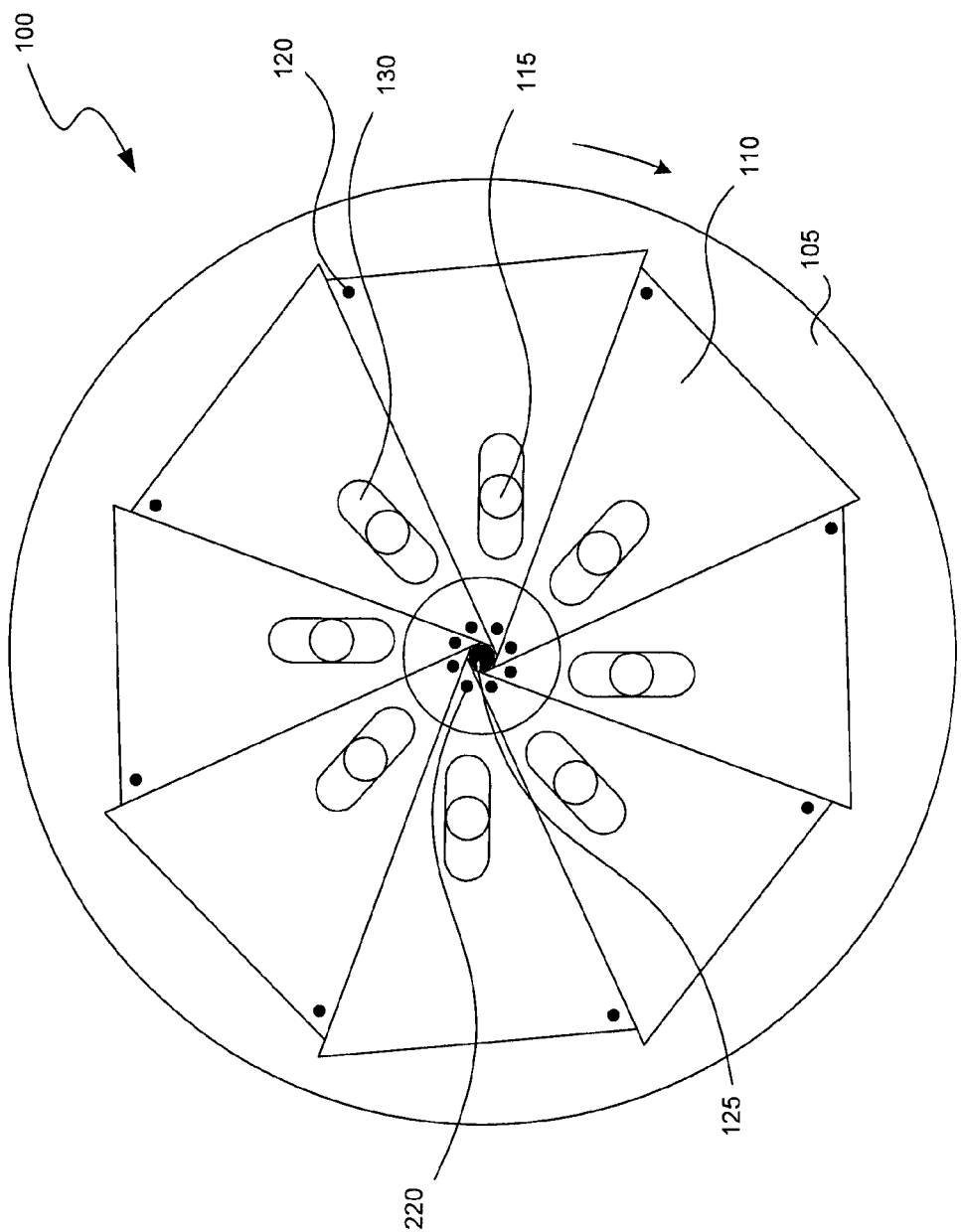
FIGS. 2A and 2B are front views illustrating an example non-overlapping iris connected to a flexible optic.
Figure 2B:
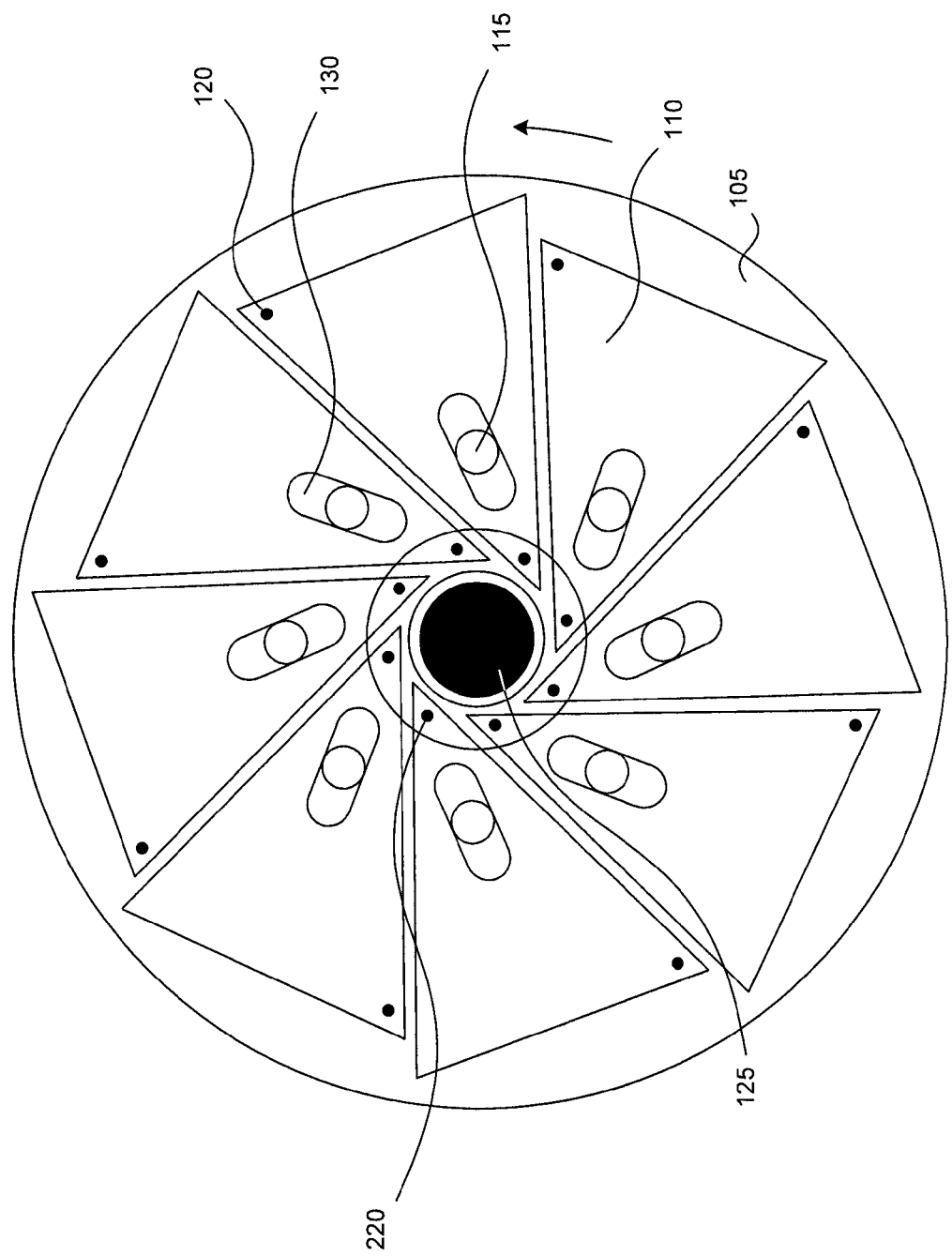

FIGS. 2A and 2B illustrate iris 100 connected to a flexible optic 210. In FIG. 2A, iris 100 is in a contracted configuration and in FIG. 2B, iris 100 is in an expanded configuration. As indicated by an arrow in FIG. 2B, the expanded configuration is obtained by rotating rotatable mount 105 in a counter-clockwise direction. Similarly, the contracted configuration is obtained by rotating rotatable mount 105 in a clockwise direction.

Flexible optic 210 is connected to each of blades 110 at a corresponding attachment point 220. Accordingly, when iris 100 contracts, it exerts a radial force on flexible optic 210 to shrink its diameter, and when iris 100 expands, it exerts a radial force on flexible optic 210 to increase its diameter. Based on this shrinking or enlarging of the diameter of flexible optic 210, the optical properties of flexible optic 210 can be modified based on the rotation of mount 105. For instance, where flexible optic 210 comprises a flexible lens or mirror, the shrinking of its diameter typically increases its curvature and decreases its focal length, while the enlargement of its diameter typically decreases its curvature and increases of its focal length.

Figure 3A:
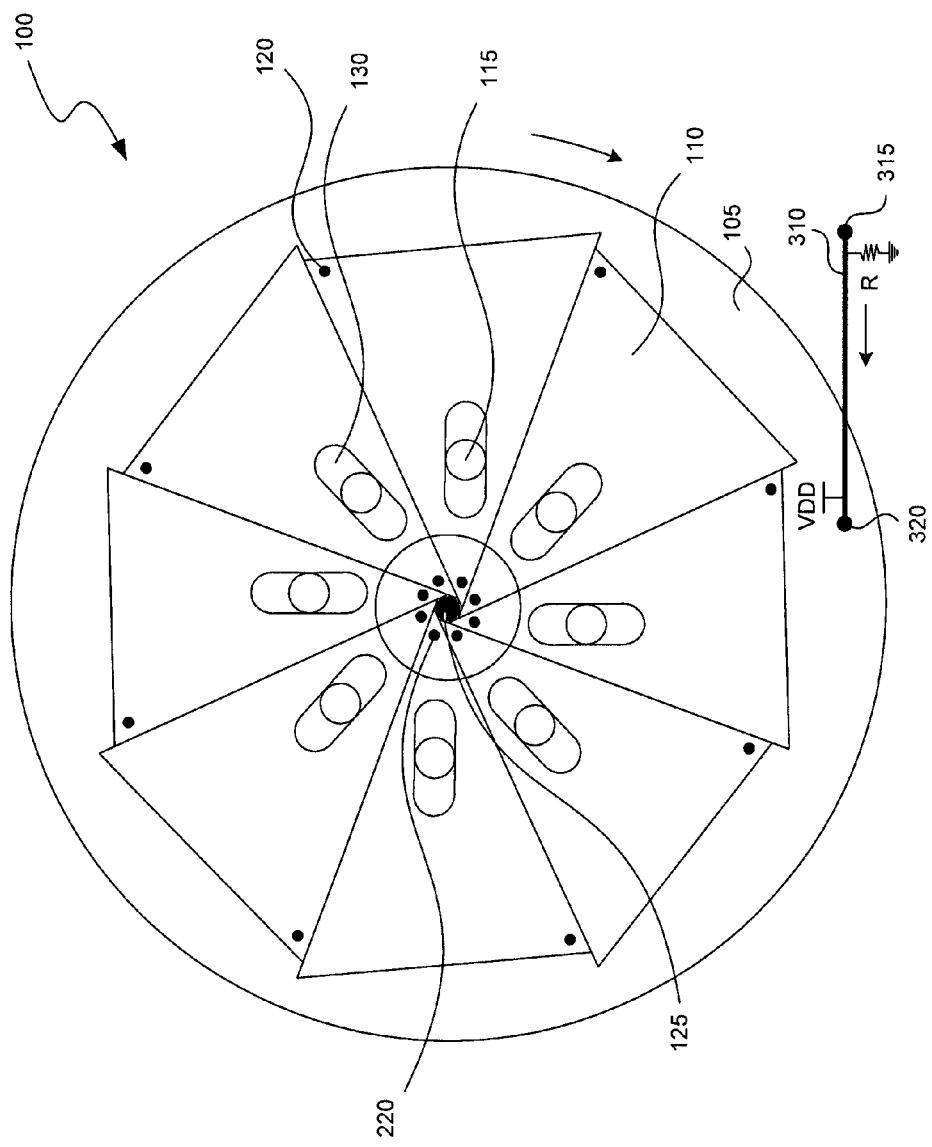
FIGS. 3A and 3B illustrate an example non-overlapping iris driven by a shape memory material actuator, based on FIGS. 2A and 2B, respectively.
Figure 3B:
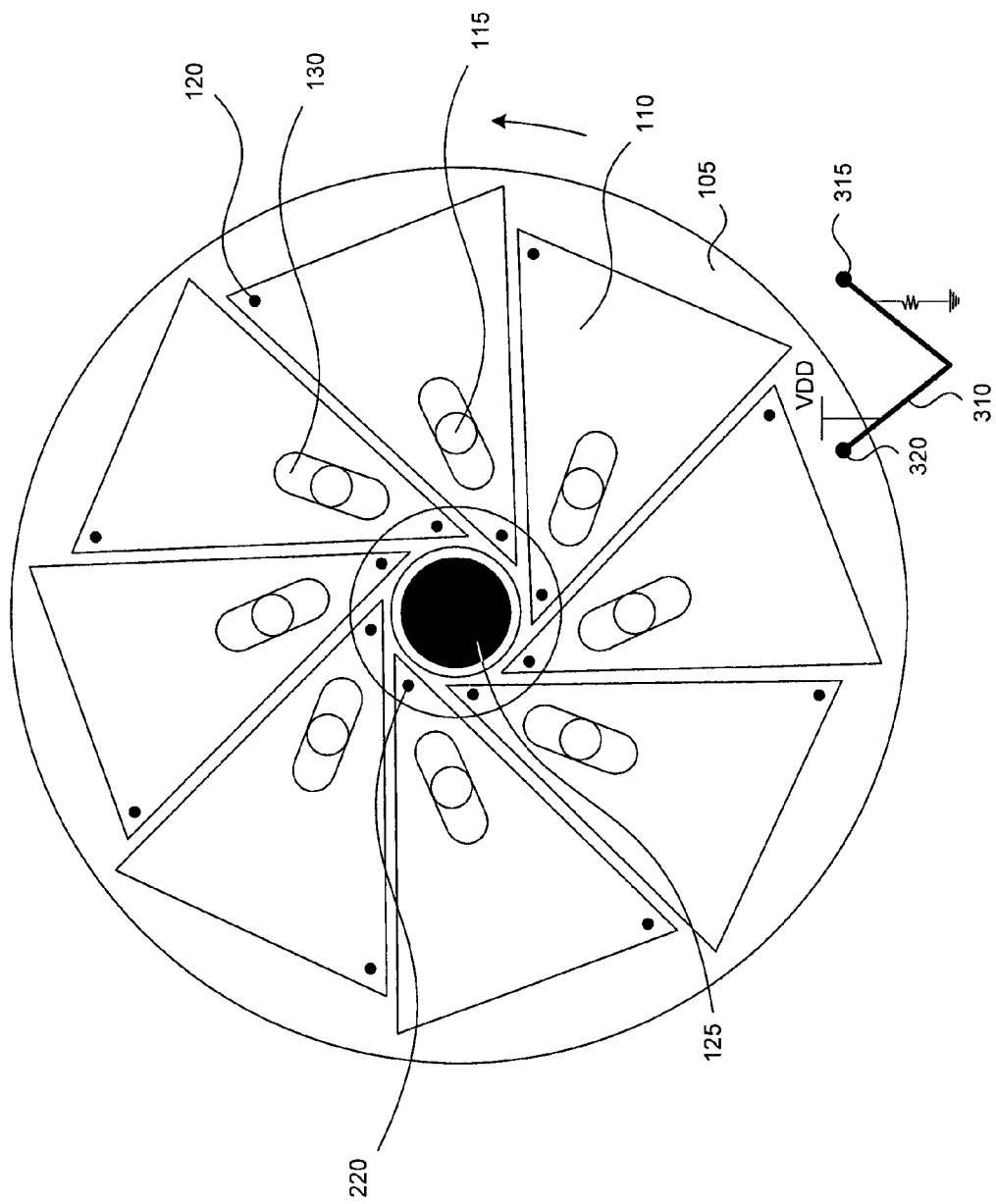

FIGS. 3A and 3B illustrate an example iris 100 in which the rotation of mount 105 is controlled by an actuator 310 comprising a shape memory material. As shown in FIGS. 3A and 3B, actuator 310 has a first end 315 attached to a fixed point apart from iris 100, and a second end 320 attached to a fixed point on mount 105. When actuator 310 is in a straight configuration shown in FIG. 3A, iris 100 is contracted, and when actuator 310 is in a bent configuration shown in FIG. 3B, iris 100 is expanded.

To help explain the operation of actuator 310 and other shape memory material components described herein, the concept of a shape memory material will be discussed briefly. As used in this disclosure, the term "shape memory material" denotes any of several materials exhibiting two or more stable, solid form configurations defined in relation to martensitic transformations of the materials. Examples of shape memory materials include shape memory alloys such as nickel-titanium (Ni—Ti), gold-cadmium (Au—Cd), copper-zinc-aluminum-nickel (Cu-Zi-Al—Ni), and copper-aluminum-nickel (Cu—Al—Ni), and shape memory ceramics such as lead zirconate ($PbZrO_3$), lead titanate ($PbZrO_3$), and lead zirconate titanate (PZT). A variety of shape memory materials and their properties are described in detail in a book entitled "Shape Memory Materials", Cambridge University Press, 1998, Edited by K. Otsuka, and C. M. Wayman (hereafter, "Otsuka"). The book also describes various techniques for forming the shape memory materials in different shapes.

A shape memory material changes configuration by realigning its crystalline structure into a different pattern. Typically, each pattern defines a different shape of the material, and therefore a shape memory material can be cycled between different shapes by changing the pattern of its crystalline structure. In a shape memory alloy, the crystalline structure can be changed by controlling the alloy's temperature or by applying physical stress to the alloy. On the other hand, in a shape memory ceramic, the crystalline structure can be changed by applying an electrical field to the ceramic.

In general, the different configurations of a shape memory material can be initially established through a "training" process designed to teach the material to "remember" different configurations. In one example, this training process involves placing the material in desired shapes while at extreme temperatures to establish the different configurations. A variety of such training processes are disclosed in detail in Otsuka, and still other training processes are known in the art.

Shape memory alloys and shape memory ceramics each have various advantages and drawbacks compared with the other. For instance, shape memory alloys tend to be more flexible and exhibit larger changes of shape compared with shape memory ceramics. However, shape memory alloys generally exhibit greater hysteresis and change shape more slowly compared with shape memory ceramics. Additionally, shape memory alloys typically require sustained input energy to maintain particular configurations due to their sensitivity to changes in temperature and physical stress, while shape memory ceramics do not require sustained input energy, since different configurations can be maintained without continued application of an electrical field.

Shape memory alloys and shape memory ceramics can both be controlled to change shape using electricity. In particular, a shape memory alloy can be heated to change its shape by passing an electrical current through the alloy. Likewise, a shape memory ceramic can be controlled to change its shape by passing an electrical current through the ceramic. On the other hand, shape memory alloys can also be controlled to change shape using non-electrical heating and/or cooling techniques.

To illustrate the electrical control of shape memory alloys and ceramics, some of the drawings show a simple electrical control system modeled as a switch "S" that can be actuated to form a current path between a power source VDD and ground through a shape memory material and a resistor "R". When the switch is closed, current flows through the shape memory material. In the case of the shape memory alloy, this current causes the alloy to heat up and change its shape, and in the case of the shape memory ceramic, the current generates an electrical field to cause the ceramic to change its shape. While some of the drawings in this disclosure do not show this simple electrical control system, each of the illustrated optical systems could use a similar electrical control system or any of several alternatives.

Although the drawings illustrate a relatively simple electrical control system, it should be recognized that a variety of different electrical control systems could be used to change the shape of the illustrated shape memory materials. In addition, it should be recognized that shape memory alloys can be heated and cooled by means other than electricity. However, because the emphasis of this disclosure is not on control systems, a detailed presentation of alternative control systems will be omitted for brevity and simplicity of explanation.

In any of the disclosed examples, features formed by shape memory materials may comprise either a shape memory alloy or a shape memory ceramic. These features may be formed entirely of a single shape memory alloy or ceramic, or they may include additional elements or features. For instance, these features may be formed by combining a shape memory ceramic with a flexible material in a layered structure to increase the amount of deformation that can be achieved by the shape memory ceramic.

The layered structure, also referred to as a bi-morph structure or a stacked structure, typically comprises thin layers of shape memory ceramic interspersed with layers of a flexible material such as a plastic polymer. The thin layers of shape memory ceramic are generally less brittle than thicker layers of shape memory ceramic, and therefore the layered structure can move in a more dynamic way than a thicker, non-layered shape memory ceramic. As another alternative, a shape memory material could be formed in a mesh or other configuration, either with or without additional elements such as stacked layers. Some examples of different structures for shape memory materials are disclosed in a related and commonly assigned U.S. patent application Ser. No. 11/968,404, the disclosure of which is incorporated by reference.

Returning to FIGS. 3A and 3B, actuator 310 can be controlled to change its shape between the straight configuration and the bent configuration. When actuator 310 changes from the straight configuration to the bent configuration, rotatable mount 105 moves in a counter-clockwise direction as indicated by the arrow in FIG. 3B to expand iris 100, and when actuator 310 changes from the bent configuration to the straight configuration, rotatable mount 105 moves in a clockwise direction as indicated by the arrow in FIG. 3A to contract iris 100.

Although shown as a rod-like structure in FIGS. 3A and 3B, actuator 310 can take other forms and shapes. For example, actuator 310 could be formed in the shape of a spring or a piston, or with a sawtooth shape, a sinusoidal shape, or any of several planar shapes. Additionally, actuator 310 could be modified to include more than one unit of shape memory metal. For instance, actuator 310 could include multiple units of shape memory metal connected together in a sequence to expand its range of motion.

Although actuator 310 is directly connected to iris 100 in the example of FIGS. 3A and 3B, actuators comprising shape memory materials could also move rotatable mount 105 by controlling other, intermediate components. For instance, shape memory material actuators could be used to move rotatable mount 105 by controlling mechanical components such a gear and clutch system, a small motor, and so forth.

Figure 4:
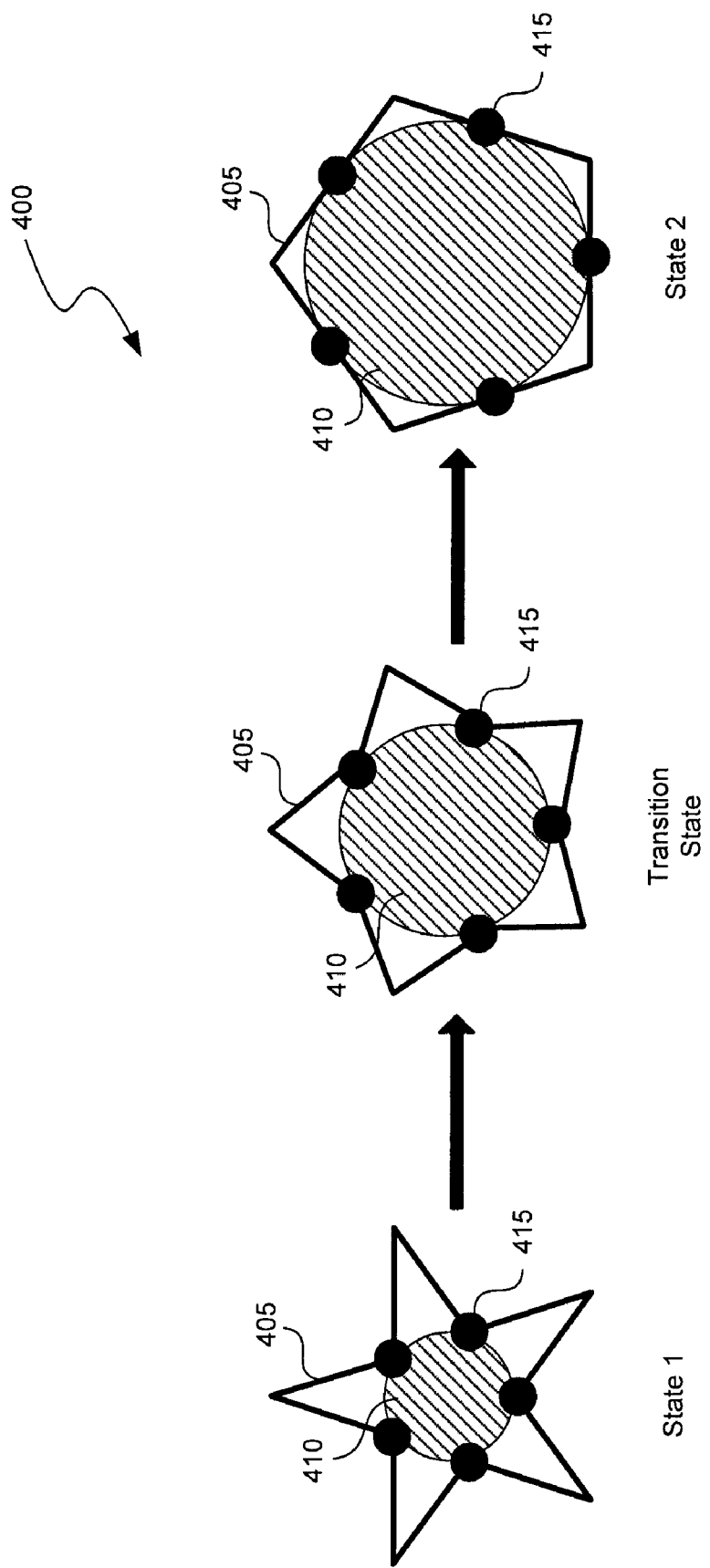
FIG. 4 illustrates an example optical system comprising a shape memory material polygon capable of controlling the deformation of a flexible optic.

FIG. 4 illustrates an example optical system 400 comprising a shape memory material polygon 405 capable of controlling the deformation of a flexible optic 410. Shape memory material polygon 405 comprises a shape memory material having two stable configurations labeled "State 1" and "State 2". For clarity of explanation, FIG. 4 also shows an intermediate non-stable state labeled "Transition State".

As shown in FIG. 4, flexible optic 410 is connected to polygon 405 at each of multiple attachment points 415 located along the perimeter of polygon 405. When polygon 405 changes from State 1 to State 2, flexible optic 410 is displaced in a radially outward direction at each of attachment points 415 to enlarge its diameter. Similarly, when polygon 405 changes from State 2 to State 1, flexible optic 410 is displaced in a radially inward direction at each of attachment points 415 to shrink its diameter.

When the diameter of flexible optic 410 changes based on the deformation of polygon 405, the optical characteristics of flexible optic 410 vary accordingly. For instance, where flexible optic 410 comprises a flexible mirror or lens, its focal length may increase when polygon 405 transitions from State 1 to State 2, and its focal length may decrease when polygon 405 transitions from State 2 to State 1.

In FIG. 4, polygon 405 is a ten-sided polygon that transitions between a crenellated or star-shaped state, to a hexagon-shaped state. In these transitions, attachment points 415 behave as "hinge" points while other portions of polygon 405 remain relatively straight. While only one type of polygon has been shown in the drawings, any of several different types of shape memory material polygons could be used to control the deformation of a flexible optic.

Figure 5:
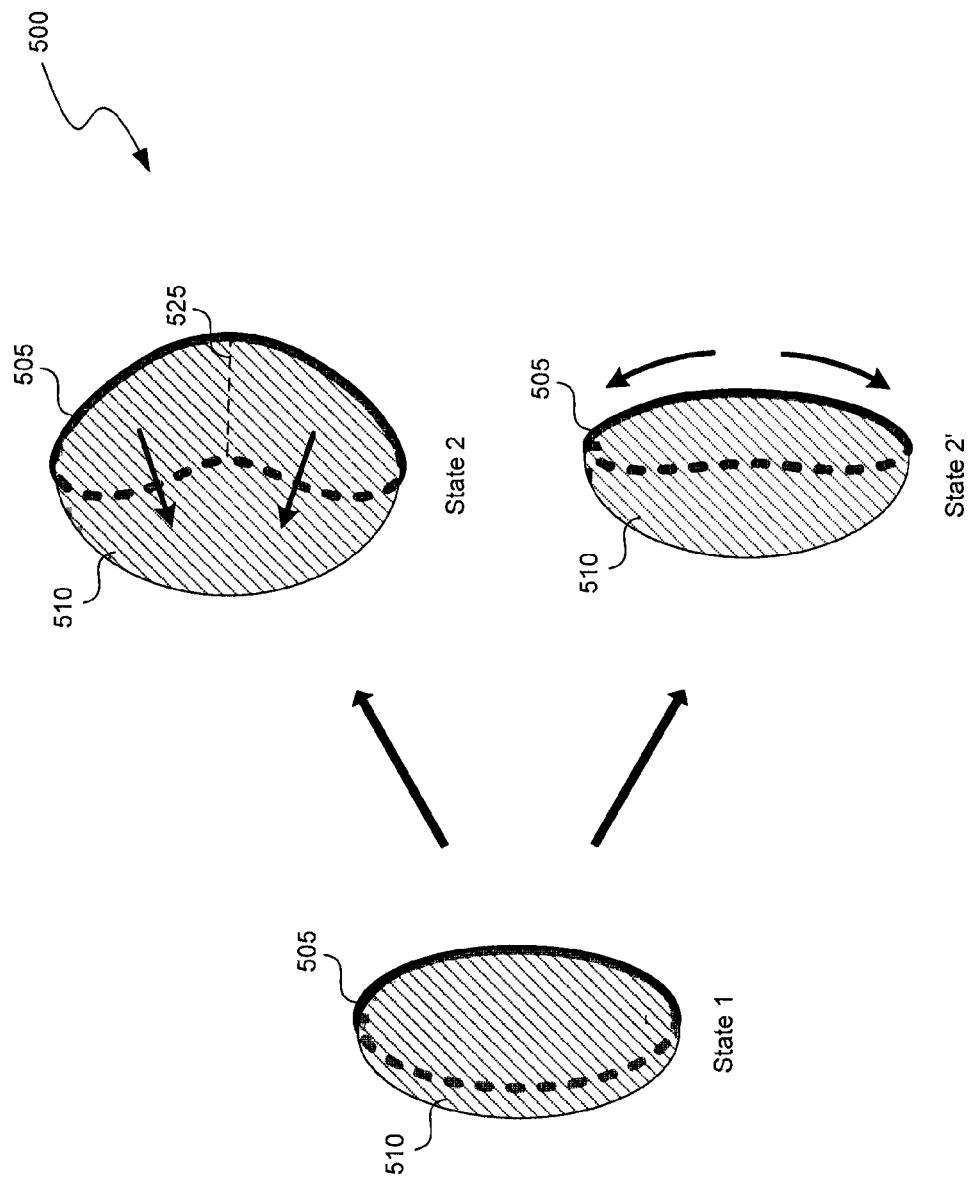
FIG. 5 is an isometric view illustrating an example optical system comprising a shape memory material ring capable of controlling the deformation of a flexible optic.

FIG. 5 illustrates an example optical system 500 comprising a shape memory material ring 505 capable of controlling the deformation of a flexible optic 510. In this example, it will be assumed that flexible optic 510 is connected around the entire perimeter of ring 505. However, in this and other examples, a flexible optic can be attached to a ring at multiple discrete attachment points similar to the attachment points shown in FIG. 4.

In the example of FIG. 5, ring 505 has two stable configurations. The first configuration is labeled State 1 and the second configuration, shown in two alternative forms, is labeled State 2 and State 2'. As seen in FIG. 5, ring 505 is bent in the second configuration to increase the curvature of flexible optic 510. Accordingly, where flexible optic 510 comprises a lens or a mirror, its focal length will be relatively larger in State 1 than in State 2 or State 2'.

Regarding the two different alternative second configurations shown in FIG. 5, the configuration labeled State 2 is obtained by deflecting ring 505 about an imaginary crease 525, and the configuration labeled State 2' is obtained by deflecting ring 505 in a curved, e.g., parabolic, manner. The deflection in State 2 causes two planes defined by ring 505 to move toward each other as indicated by two straight arrows, and the deflection in State 2' produces a general curvature in ring 505 as indicated by curved arrows.

Figure 6:
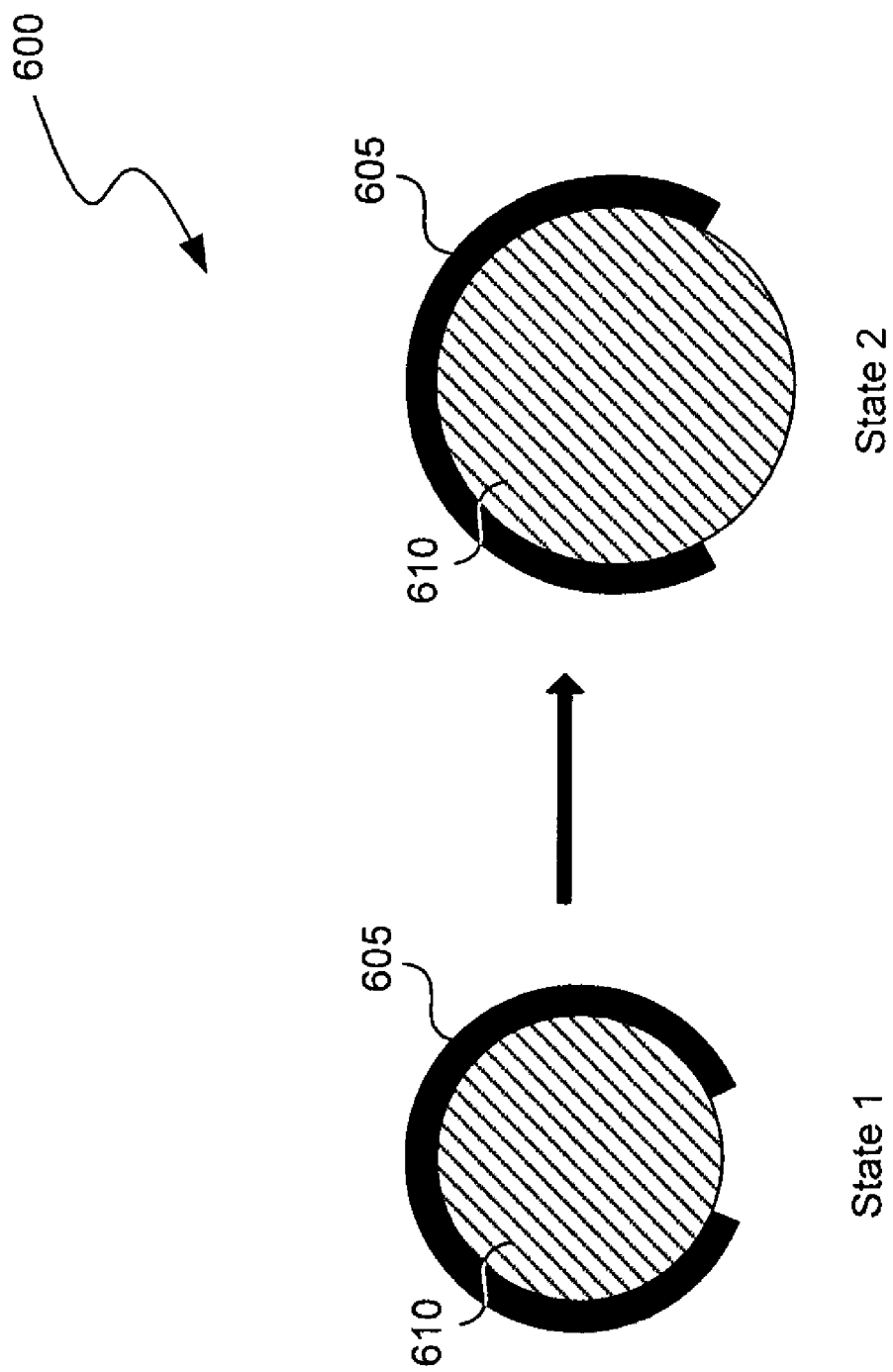
FIG. 6 illustrates an example optical system comprising a split ring formed by shape memory material and capable of controlling the deformation of a flexible optic.

FIG. 6 illustrates an example optical system 600 comprising a split ring 605 formed by shape memory material and capable of controlling the deformation of a flexible optic 610. In this example, flexible optic 610 is attached to split ring 605 about the perimeter of flexible optic 610 such that the diameter of flexible optic 610 changes based on the diameter of split ring 605.

Like other examples that use shape memory materials, split ring 605 has two stable configurations labeled State 1 and State 2. When split ring 605 transitions from State 1 to State 2, its diameter increases, as does the diameter of flexible optic 610. Similarly, when split ring 605 transitions from State 2 to State 1, its diameter decreases, as does the diameter of flexible optic 610. Accordingly, by changing split ring 605 between States 1 and 2, flexible optic 610 is deformed to change its optical properties such as its focal length.

Figure 7:
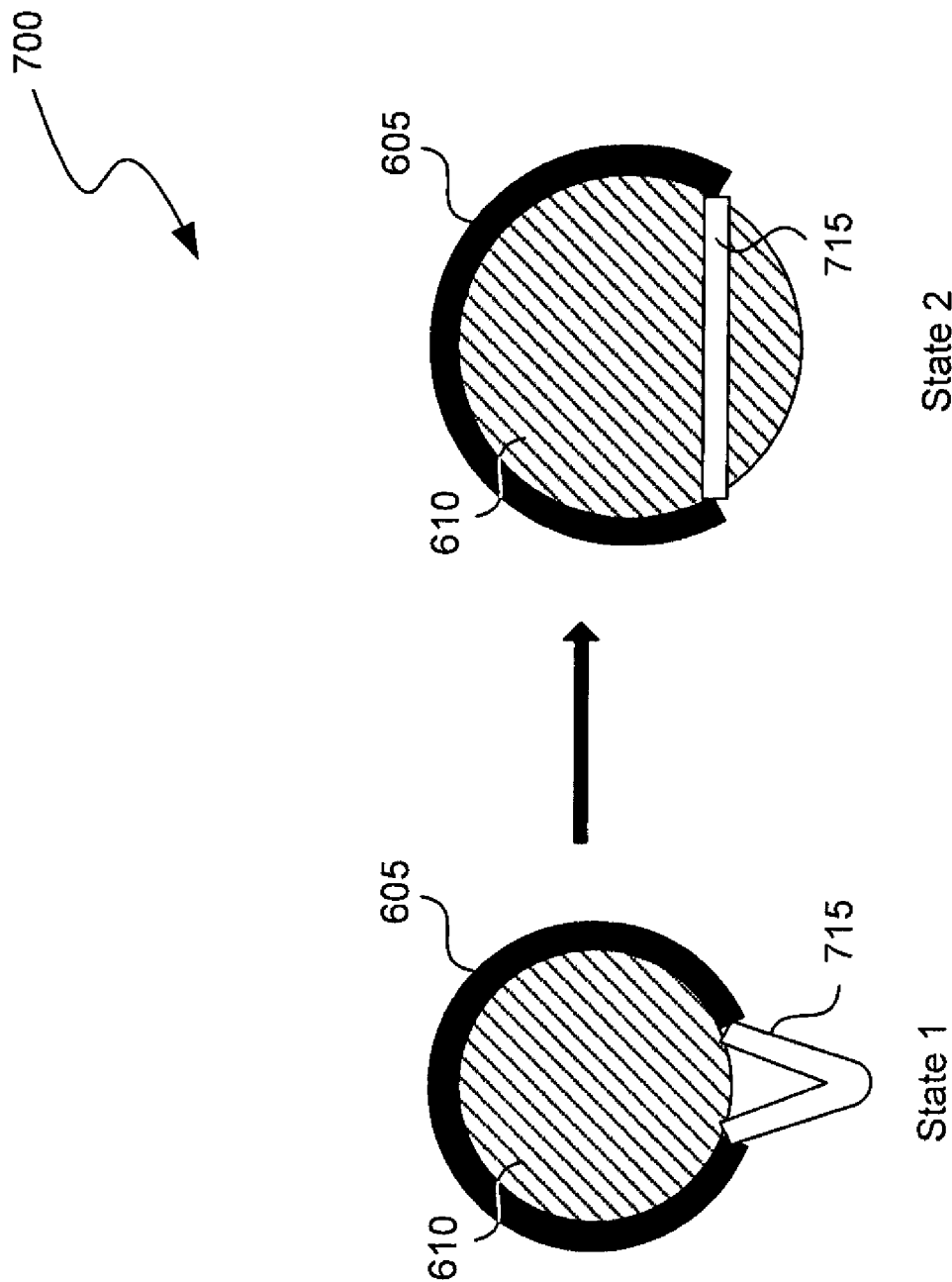
FIG. 7 illustrates an example optical system comprising a split ring controlled by a shape memory material to deform a flexible optic.

FIG. 7 illustrates an example optical system 700 comprising a split ring 705 controlled by an actuator 715 to deform a flexible optic 710. Flexible optic 710 is attached to split ring 705 about the perimeter of flexible optic 710 such that the diameter of flexible optic 710 changes based on the diameter of split ring 705.

Split ring 705 comprises a flexible material such as a flexible polymer or a flexible metal ring, and actuator 715 comprises a shape memory material. Alternatively, split ring 705 could also comprise a shape memory material, any type of spring material, or any of many variants of split rings or interlocking rings which change their diameter in response to the application of force.

Actuator 715 has two stable configurations including a bent configuration labeled State 1 and a straight configuration labeled State 2. Actuator 715 can be controlled to change its shape between the bent configuration and the straight configuration. When actuator 715 changes from the bent configuration to the straight configuration, the diameter of split ring 705 increases along with the diameter of flexible optic 710. On the other hand, when actuator 715 changes from the straight configuration to the bent configuration, the diameter of split ring 705 decreases along with the diameter of flexible optic 710. Accordingly, by controlling actuator 715 to modify the diameter of split ring 705, flexible optic can be deformed to change its optical properties such as its focal length.

Although actuator 715 is shown as a rod-like structure in FIG. 7, actuator 715 can take other forms and shapes. For example, actuator 715 could be formed in the shape of a spring or a piston, or with a sawtooth shape, a sinusoidal shape, or any of several planar shapes. Additionally, actuator 715 could be modified to include more than one unit of shape memory metal. For instance, actuator 715 could include multiple units of shape memory metal connected together in a sequence to expand its range of motion.

In view of the foregoing, it can be seen that various examples of the invention are capable of deforming a flexible optic to modify its optical characteristics. By comparison with conventional techniques and technologies, these examples tend to be relatively simple and easy to use. For instance, in some examples, a flexible optic is deformed by applying a short electrical pulse to a small unit of shape memory material such as a shape memory alloy or a shape memory ceramic.

The disclosed examples tend to provide a variety of benefits to optical systems when used in the place of alternative approaches. For instance, when selected examples are used to deform flexible optics instead of motor-based approaches, the resulting optical systems tend to be less expensive, less complicated to control, more reliable, and more power efficient. In addition, by replacing motors with small actuators formed of shape memory metals, the size of an optical system can be reduced and flexible optics can be more accurately deformed due to the lack of motor characteristics such as gear lash and hysteresis.

The above detailed description of examples of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize.

Any patents and applications and other references noted above, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its implementation details, while still being encompassed by the invention disclosed herein. Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the terms "operatively connected", "functionally connected", or variants thereof indicate that two or more features are connected in such a way that the operation of one feature can affect the operation or configuration of another feature.

The words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While certain aspects of the invention are presented below in certain claim forms, the inventors contemplate the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the inventors reserve the right to add additional claims after filing the application to pursue such additional claim forms for other aspects of the invention.

I claim:

1. An optical system for use in a bar code scanner or imager, the system comprising:
    an actuator assembly comprising:
        a shape memory material having a first stable geometric state and a second stable geometric state, and
        a state changing component coupled to the shape memory material, wherein the state changing component is configured to automatically change the shape memory material from the first stable geometric state to the second stable geometric state; and
    at least one flexible optic operatively connected to the actuator assembly and configured to change shape in response to a transition of the shape memory material between the first and second stable geometric states, and wherein the flexible optic provides a differing reflective, refractive, deflection, or transmissive optical characteristic for the optical system based on the shape change.

2. The optical system of claim 1, wherein the flexible optic comprises a lens or a mirror, and wherein the flexible optic changes shape by modifying its curvature to vary a focal length of the lens or mirror.

3. The optical system of claim 1, wherein
    the flexible optic comprises a lens or mirror;
    the flexible optic changes shape by modifying its curvature to vary a focal length of the lens or mirror; and
    the lens or mirror is used to focus incoming light in an imager or to focus outgoing light for a bar-code scanner.

4. The optical system of claim 1, further comprising:
    an iris comprising multiple blades attached to a rotatable mount that rotates in response to the transition of the shape memory material, the blades defining an aperture with a size that varies based on rotation of the rotatable mount;
    wherein the flexible optic is attached to the blades such that the flexible optic changes shape in response to variation in the size of the aperture.

5. The optical system of claim 1, further comprising:
    an iris comprising multiple blades attached to a rotatable mount that rotates in response to transition of the shape memory material, the blades defining an aperture with a size that varies based on the rotation of the rotatable mount;
    wherein the flexible optic is attached to the blades at multiple attachment points such that the flexible optic changes shape by modifying its diameter in response to a radial force exerted at each of the attachment points in response to the variation in the size of the aperture.

6. The optical system of claim 1, wherein:
    the actuator assembly comprises a polygon shape formed of shape memory material, and the flexible optic is attached to the polygon shape at multiple attachment points about the polygon shape's perimeter;
    the shape memory material transitions from the first stable geometric state to the second stable geometric state by bending the polygon shape at the attachment points to increase or decrease an area within the polygon shape; and
    the flexible optic changes shape by expanding or contracting its diameter in accordance with the bending of the polygon shape.

7. The optical system of claim 1, wherein:
    the actuator assembly comprises a ring shape formed of shape memory material, and the flexible optic is attached to the ring shape about the ring shape's perimeter; and
    the shape memory material transitions from the first stable geometric state to the second stable geometric state by bending the ring shape to increase the curvature of the flexible optic.

8. The optical system of claim 1, wherein:
    the flexible optic is attached to a flexible split ring shape around a perimeter of the flexible optic;
    the actuator assembly is connected between two ends of the flexible split ring shape such that when the shape memory material transitions from the first stable geometric state to the second stable geometric state, it causes a diameter of the flexible split ring to increase or decrease, thereby increasing or decreasing a diameter of the flexible optic.

9. A method of deforming a flexible optic, the method comprising:
    providing an actuator comprising a shape memory material, wherein the shape memory material has a first predetermined geometric configuration associated with a first stable state and a second predetermined geometric configuration associated with a second stable state, wherein the first and second predetermined geometric configurations differ;
    deforming the shape memory material from the first predetermined geometric configuration to the second predetermined geometric configuration; and
    in response to the deformation of the shape memory material, modifying a shape of the flexible optic from a first optical state to a second optical state, wherein the second optical state differs from the first optical state.

10. The method of claim 9, wherein the flexible optic comprises a lens, and wherein modifying the shape of the flexible optic comprises modifying the curvature of the lens to vary the lens's focal length.

11. The method of claim 9, wherein the flexible optic comprises a mirror, and wherein modifying the shape of the flexible optic comprises modifying the curvature of the lens to vary the mirror's focal length.

12. The method of claim 9, wherein:
    the flexible optic comprises a lens;
    modifying the shape of the flexible optic comprises modifying the curvature of the lens to vary the lens's focal length; and
    the lens is used to focus incoming light in an imager or camera.

13. The method of claim 9, wherein:
    the flexible optic comprises a mirror;
    modifying the shape of the flexible optic comprises modifying the curvature of the lens to vary the mirror's focal length; and
    the mirror is used to focus outgoing light for a bar-code scanner.

14. The method of claim 9, wherein:

the flexible optic is attached to a non-overlapping iris comprising multiple wedge-shaped blades attached to a rotatable mount;

the actuator is attached to the rotatable mount; and the deformation of the shape memory material initiates rotation of the rotatable mount to shrink or enlarge an aperture of the iris, thereby modifying the shape of the flexible optic.

15. The method of claim 9, wherein:

the actuator comprises a polygon shape formed of shape memory material, and the flexible optic is attached to the polygon shape at multiple attachment points about the polygon shape's perimeter;

deforming the shape memory material from the first stable geometric configuration to the second stable geometric configuration comprises bending the polygon shape at the attachment points to increase or decrease an area within the polygon shape; and modifying the shape of the flexible optic comprises expanding or contracting a diameter of the flexible optic in accordance with the deformation of the polygon shape.

16. The method of claim 9, wherein:

the actuator comprises a ring shape formed of shape memory material, and the flexible optic is attached to the ring shape about the ring shape's perimeter; and deforming the shape memory material from the first stable geometric configuration to the second stable geometric configuration comprises bending the ring shape to increase the curvature of the flexible optic.

17. The method of claim 9, wherein:

the flexible optic is attached to a flexible split ring shape about a perimeter of the flexible optic;

the actuator is connected between two ends of the flexible split ring shape such that when the shape memory material deforms from the first stable geometric configuration to the second stable geometric configuration, it causes a diameter of the flexible split ring to increase or decrease, thereby increasing or decreasing a diameter of the flexible optic.

18. An optical system, comprising:

holding means for holding a flexible optic;

actuating means for moving the holding means to deform the flexible optic in response to a transition of a shape memory material from a first stable geometric configuration to a second stable geometric configuration, wherein the flexible optic changes from a first optical property associated with the first stable geometric configuration to a second optical property associated with the second stable geometric configuration.

19. The optical system of claim 18, wherein the flexible optic is connected to the holding means by multiple attachment points, and the flexible optic is deformed by a radial force exerted at each of the of the attachment points.

20. The optical system of claim 18, wherein the shape memory material comprises a shape memory ceramic.

21. The optical system of claim 18, wherein the flexible optic comprises a lens or a mirror and the lens or mirror is deformed to vary its focal length.

22. The optical system of claim 18, further comprising:

electrical control means for controlling the transition of the shape memory material.

* * * * *